(12) United States Patent
Karasawa

(10) Patent No.: US 6,787,791 B2
(45) Date of Patent: Sep. 7, 2004

(54) RADIATION IMAGE INFORMATION READ-OUT APPARATUS

(75) Inventor: Hiroyuki Karasawa, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 191 days.

(21) Appl. No.: 09/987,087

(22) Filed: Nov. 13, 2001

(65) Prior Publication Data

US 2002/0096653 A1 Jul. 25, 2002

(30) Foreign Application Priority Data

Nov. 10, 2000 (JP) ........................................ 2000-342889

(51) Int. Cl.$^7$ ................................................ G03B 42/08
(52) U.S. Cl. ...................................... 250/586; 250/584
(58) Field of Search ................................ 250/581, 582, 250/584, 585, 586, 587

(56) References Cited

U.S. PATENT DOCUMENTS

| | | | |
|---|---|---|---|
| 4,816,679 A | 3/1989 | Sunagawa et al. | 250/327.2 |
| 4,922,103 A | 5/1990 | Kawajiri et al. | 250/327.2 |
| 5,396,081 A * | 3/1995 | Ogura et al. | 250/585 |

FOREIGN PATENT DOCUMENTS

| | | | |
|---|---|---|---|
| JP | 61-111568 | 6/1985 | H04N/1/04 |
| JP | 60-236354 | 11/1985 | H04N/1/04 |
| JP | 1-101540 | 4/1989 | G03B/42/02 |

OTHER PUBLICATIONS

Abstract JP 1101540, Apr. 19, 1989.

* cited by examiner

Primary Examiner—Constantine Hannaher
Assistant Examiner—Timothy Moran
(74) Attorney, Agent, or Firm—Sughrue Mion, PLLC

(57) ABSTRACT

A radiation image read-out apparatus includes a stimulating light projecting system which projects a line stimulating light beam onto a stimulable phosphor sheet, a line sensor consisting of a plurality of photoelectric convertor elements which detect stimulated emission emitted from the portion exposed to the line stimulating beam and are arranged in a row, a condenser lens which is disposed along the line sensor to collect the stimulated emission on the light receiving face of the line sensor and a sub-scanning mechanism which moves one of the line sensor and the stimulable phosphor sheet relatively to each other in a sub-scanning direction. The condenser lens has a chromatic aberration of magnification in the sub-scanning direction such that most of the stimulated emission is collected on the light receiving and most of the stimulating light is collected outside the light receiving face.

9 Claims, 6 Drawing Sheets

RADIATION IMAGE INFORMATION READ-OUT APPARATUS

BACKGROUND OF THE INVENTION

1. Field of the Invention

This invention relates to a radiation image read-out apparatus, and more particularly to a radiation image read-out apparatus for reading out a radiation image stored on a stimulable phosphor sheet by the use of a line sensor.

2. Description of the Related Art

When certain kinds of phosphor are exposed to a radiation, they store a part of energy of the radiation. Then when the phosphor which has been exposed to the radiation is exposed to stimulating rays such as visible light or a laser beam, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been put into wide use a radiation image recording and reproducing system as a computed radiography in which a stimulable phosphor sheet (a sheet comprising a support sheet and a layer of the stimulable phosphor formed thereon) is exposed to a radiation passing through an object such as a human body to have a radiation image of the object stored on the stimulable phosphor sheet, a stimulating light beam such as a laser beam is projected onto the stimulable phosphor sheet, the stimulated emission emitted from the stimulable phosphor sheet upon excitation by the stimulating light is photoelectrically detected, thereby obtaining an image signal, and then the stimulable phosphor sheet is exposed to erasing light after the image signal is obtained from the stimulable phosphor sheet so that the residual energy of the radiation is fully released from the stimulable phosphor sheet.

It has been proposed to allot the radiation absorbing function and the energy storing function of the stimulable phosphor conventionally employed in the radiation image recording and reproducing system between two kinds of phosphor, one being excellent in the radiation absorbing function and the other being quick in response in emitting the stimulated emission upon excitation by the stimulating light. With this arrangement, the radiation absorbing efficiency can be improved and at the same time, the energy storing efficiency can be increased. There also has been proposed a system in which a phosphor excellent in radiation absorbing power is caused to absorb the radiation, another phosphor quick in response in emitting the stimulated emission upon excitation by the stimulating light is caused to absorb light emitted from the phosphor excellent in radiation absorbing power upon excitation by light in ultraviolet to visible region and to store energy, then said another phosphor is excited by light in visible to infrared region to emit stimulated emission, and the stimulated emission is photoelectrically read by a photoelectric read-out means to obtain an image signal. (See, Japanese Patent Application No. 11(1999)-372978.)

The radiation image signal obtained in the systems described above is subjected to image processing such as gradation processing and/or frequency processing and a radiation image of the object is reproduced as a visible image for diagnosis on the basis of the processed radiation image signal on a recording medium such as a photographic film or a display such as a high-resolution CRT. When the stimulable phosphor sheet is exposed to erasing light, the residual energy of the radiation is fully released from the stimulable phosphor sheet and the stimulable phosphor sheet comes to be able to store a radiation image again, whereby the stimulable phosphor sheet can be repeatedly used.

In the radiation image information read-out apparatus employed in the radiation image recording and reproducing apparatus, it has been proposed to use a line light source which projects a line beam onto the stimulable phosphor sheet as a stimulating light source and to use a line sensor having an array of photoelectric convertor elements extending in the main scanning direction (the longitudinal direction of the line beam) as a means for photoelectrically reading out the stimulated emission. The line beam and the line sensor are moved relative to the stimulable phosphor sheet in a sub-scanning direction (the direction substantially perpendicular to the longitudinal direction of the line beam) by a scanning means. By the use of a line beam and a line sensor, the reading time is shortened, the overall size of the apparatus can be reduced and the cost can be reduced. See, for instance, Japanese Unexamined Patent Publication Nos. 60(1985)-111568, 60(1985)-236354, and 1(1989)-101540. In such a radiation image information read-out apparatus, the line sensor is positioned close to the stimulable phosphor sheet and a condenser lens is provided between the line sensor and the stimulable phosphor sheet in order to collect the stimulated emission on the light receiving face of the line sensor.

In the radiation image information read-out apparatus, there has been a problem that a part of the stimulating light projected onto the surface of the stimulable phosphor sheet is reflected by the surface of the stimulable phosphor sheet to impinge upon the line sensor and deteriorates the image in contrast.

In order to overcome this problem, it has been proposed to insert a color glass filter suitable for cutting the stimulating light between the stimulable phosphor sheet and the line sensor. However since the line sensor is positioned close to the stimulable phosphor sheet, and at the same time the condenser lens is provided between the line sensor and the stimulable phosphor sheet as described above, the thickness of the color filter to be inserted between the stimulable phosphor sheet and the line sensor is limited. Accordingly, the stimulating light cannot be satisfactorily cut and the contrast of the image cannot be satisfactorily increased.

SUMMARY OF THE INVENTION

In view of the foregoing observations and description, the primary object of the present invention is to provide a radiation image information read-out apparatus in which the stimulating light can be satisfactorily separated from the stimulated emission not to impinge upon the line sensor.

In one aspect of the present invention, there is provided a radiation image read-out apparatus comprising a stimulating light beam projecting means which projects a line stimulating light beam onto a stimulable phosphor sheet, storing thereon radiation image information, to extend in a main scanning direction, a line sensor consisting of a plurality of photoelectric convertor elements which receive stimulated emission emitted from the portion exposed to the line stimulating beam to convert the amount of stimulated emission to an electric signal and are arranged in a row which extends along the line portion of the stimulable phosphor sheet exposed to the line stimulating beam, a condenser lens which is disposed along the line sensor to collect the stimulated emission on the light receiving face of the line sensor and a sub-scanning means which moves one of the line sensor and the stimulable phosphor sheet relatively to each other in a sub-scanning direction intersecting the main scanning direction, wherein the improvement comprises that said condenser lens has a chromatic aberration of magnification in the sub-scanning direction such that most of the light in the wavelength range of the stimulated emission is collected on the light receiving face of the line sensor and most of the light in the wavelength range of the stimulating light is collected outside the light receiving face of the line sensor.

Generally the wavelength of the stimulating light is longer than that of the stimulated emission. The present invention is characterized in that the stimulating light and the stimulated emission are separated from each other on the basis of the chromatic aberration of magnification generated by the wavelength difference therebetween.

The expression "most of the light in the wavelength range of the stimulated emission is collected on the light receiving face of the line sensor" means that, though a part of the light in the wavelength range of the stimulated emission may go outside the light receiving face of the line sensor, the amount of the light collected on the light receiving face of the line sensor is more than that going outside the same. Similarly, the expression "most of the light in the wavelength range of the stimulating light is collected outside the light receiving face of the line sensor" means that, though a part of the light in the wavelength range of the stimulating light may impinge upon the light receiving face of the line sensor, the amount of the light collected outside the light receiving face of the line sensor is more than that impinging upon the same.

The chromatic aberration of magnification depends upon the size of the light receiving face, the diameter of the condenser lens, the distance between the light receiving face and the condenser lens, and the like, and accordingly, the chromatic aberration of magnification can be controlled to satisfy the aforesaid condition by adjusting the size of the light receiving face, the diameter of the condenser lens, the distance between the light receiving face and the condenser lens, and the like as well as the properties of the condenser lens itself (e.g., the refractive index).

In another aspect of the present invention, there is provided a radiation image read-out apparatus comprising a stimulating light beam projecting means which projects a line stimulating light beam onto a stimulable phosphor sheet, storing thereon radiation image information, to extend in a main scanning direction, a line sensor consisting of a plurality of photoelectric convertor elements which receive stimulated emission emitted from the portion exposed to the line stimulating beam to convert the amount of stimulated emission to an electric signal and are arranged in a row which extends along the line portion of the stimulable phosphor sheet exposed to the line stimulating beam, a condenser lens which is disposed along the line sensor to collect the stimulated emission on the light receiving face of the line sensor and a sub-scanning means which moves one of the line sensor and the stimulable phosphor sheet relatively to each other in a sub-scanning direction intersecting the main scanning direction, wherein the improvement comprises that the following formula (1) is satisfied, $$\frac{1(mm)}{\lambda a(nm) - \lambda b(nm)} \leq \frac{\Delta d(mm)}{\Delta \lambda(nm)} \quad (1)$$

wherein $\lambda a$ (nm) represents the center wavelength of the stimulating light, $\lambda b$ (nm) represents the center wavelength of the stimulated emission, $\Delta \lambda$ (nm) represents the wavelength difference between the longest wavelength and the shortest wavelength of the incident light components on the condenser lens and $\Delta d$ (mm) represents the distance of dispersion on the light receiving face of the incident light components on the condenser lens.

As described above, center wavelength of the stimulating light $\lambda a$>center wavelength of the stimulated emission $\lambda b$, and to satisfy formula (1) means that the difference between the wavelength of the stimulating light and that of the stimulated emission $\lambda a - \lambda b$ results in the distance of dispersion on the light receiving face between the stimulating light and the stimulated emission not smaller than 1 mm. The ratio of the distance of dispersion on the light receiving face between the longest wavelength and the shortest wavelength of the incident light components on the condenser lens to the wavelength difference between the longest wavelength and the shortest wavelength of the incident light components on the condenser lens $\Delta d/\Delta \lambda$ is defined to be the dichroic aberration of magnification, here.

Since the chromatic aberration of magnification depends upon the size of the light receiving face, the diameter of the condenser lens, the distance between the light receiving face and the condenser lens, and the like as described above, the sizes and the distance are set so that the chromatic aberration of the condenser lens satisfies the above formula (1).

It is further preferred that the following formula (2) be satisfied $$\frac{\Delta d(mm)}{\Delta \lambda(nm)} \leq \frac{0.4(mm)}{\Delta \lambda b / 2(nm)} \quad (2)$$

wherein $\Delta \lambda b$ (nm) represents the width of the wavelength range of the stimulated emission.

In order to separate the stimulating light and the stimulated emission from each other, the more the chromatic aberration of magnification is, the better it is. On the other hand, when the chromatic aberration of magnification is excessively large, in the case of the stimulated emission whose wavelength range has a certain width, the stimulated emission collecting efficiency in the sub-scanning direction deteriorates since the stimulated emission spreads over a too large area due to the too large chromatic aberration of magnification and at the same time, the stimulated emission emitted from one pixel spreads over a plurality of photoelectric convertor elements arranged in the main scanning direction on the light receiving face of the line sensor, which results in deterioration in sharpness. This problem can be prevented when formula (2), which limits the distance of dispersion for a given width of the wavelength range of the stimulated emission, is satisfied. The above formula (2) means that the distance of dispersion should be not larger than 0.4 mm for a half of the width of the wavelength range of the stimulated emission.

Generally, the width of the wavelength range of the stimulated emission $\Delta \lambda b$ is smaller than the difference between the center wavelength of the stimulating light and the center wavelength of the stimulated emission.

It is preferred that the effective width of the photoelectric convertor element as measured in the direction perpendicular to the longitudinal direction of the line sensor be 20 $\mu$m to 300 $\mu$m. The effective width may be formed by covering with light-shielding material a part of the light receiving face of a photoelectric convertor element having a larger light receiving face.

It is further preferred that a stimulating light cut filter which is permeable to the stimulated emission and impermeable to the stimulating light be disposed between the line sensor and the stimulable phosphor sheet. The expression "the stimulating light cut filter is permeable to the stimulated emission and impermeable to the stimulating light" does not express that the stimulating light cut filter transmits 100% of the stimulated emission and no stimulating light but only express that the stimulating light cut filter is more permeable to the stimulated emission than to the stimulating light.

It is preferred that the condenser lens be not larger in the distance of dispersion of incident light on the condenser lens in the longitudinal direction of the light receiving face of the line sensor than that in the direction perpendicular to the longitudinal direction of the light receiving face of the line sensor as measured on the light receiving face of the line sensor.

When the condenser lens has a chromatic aberration of magnification in the sub-scanning direction such that most of the light in the wavelength range of the stimulated emission is collected on the light receiving face of the line sensor and most of the light in the wavelength range of the stimulating light is collected outside the light receiving face of the line sensor, the stimulating light is suppressed from impinging upon the photoelectric convertor elements in the sub-scanning direction, whereby the image can be enhanced in contrast.

To satisfy formula (1) means that the difference between the wavelength of the stimulating light and that of the stimulated emission $\lambda a - \lambda b$ results in the distance of dispersion on the light receiving face between the stimulating light and the stimulated emission not smaller than 1 mm. When the effective width of the light receiving face is sufficiently smaller than the distance of dispersion on the light receiving face between the stimulating light and the stimulated emission, most of the stimulating light can be collected outside the light receiving face of the line sensor in the sub-scanning direction by causing most of the light in the wavelength range of the stimulated emission to be collected on the light receiving face of the line sensor, whereby the stimulating light is suppressed from impinging upon the photoelectric convertor elements in the sub-scanning direction, and the image can be enhanced in contrast.

When the aforesaid formula (2) is satisfied, the stimulated emission is suppressed from going outside the light receiving face due to the chromatic aberration of magnification of the condenser lens and from impinging upon a plurality of photoelectric convertor elements. For example, when the effective width of the light receiving face is assumed to be 100 $\mu$m, spread of the stimulated emission can be suppressed not larger than four pixels, and accordingly deterioration in sharpness of the image due to dispersion of the stimulated emission can be prevented.

When the effective width of the photoelectric convertor element as measured in the direction perpendicular to the longitudinal direction of the line sensor is 20 to 300 $\mu$m, the effect of formulae (1) and (2) is enhanced.

Further, when a stimulating light cut filter which is permeable to the stimulated emission and impermeable to the stimulating light is disposed between the line sensor and the stimulable phosphor sheet, the amount of the stimulating light impinging upon the photoelectric convertor elements can be further reduced, whereby the contrast of the image can be further enhanced.

Further, when the condenser lens is larger in the distance of dispersion of incident light on the condenser lens in the sub-scanning direction of the light receiving face of the line sensor than that in the main scanning direction of the light receiving face of the line sensor as measured on the light receiving face of the line sensor, more stimulating light can be caused to go outside the light receiving face while deterioration of stimulated emission collecting efficiency can be suppressed in the sub-scanning direction and at the same time, dispersion of the stimulated emission in the main scanning direction over a plurality of photoelectric convertor elements can be suppressed, whereby deterioration in sharpness of the image can be prevented.

DESCRIPTION OF THE PREFERRED EMBODIMENTS

Figure 1:
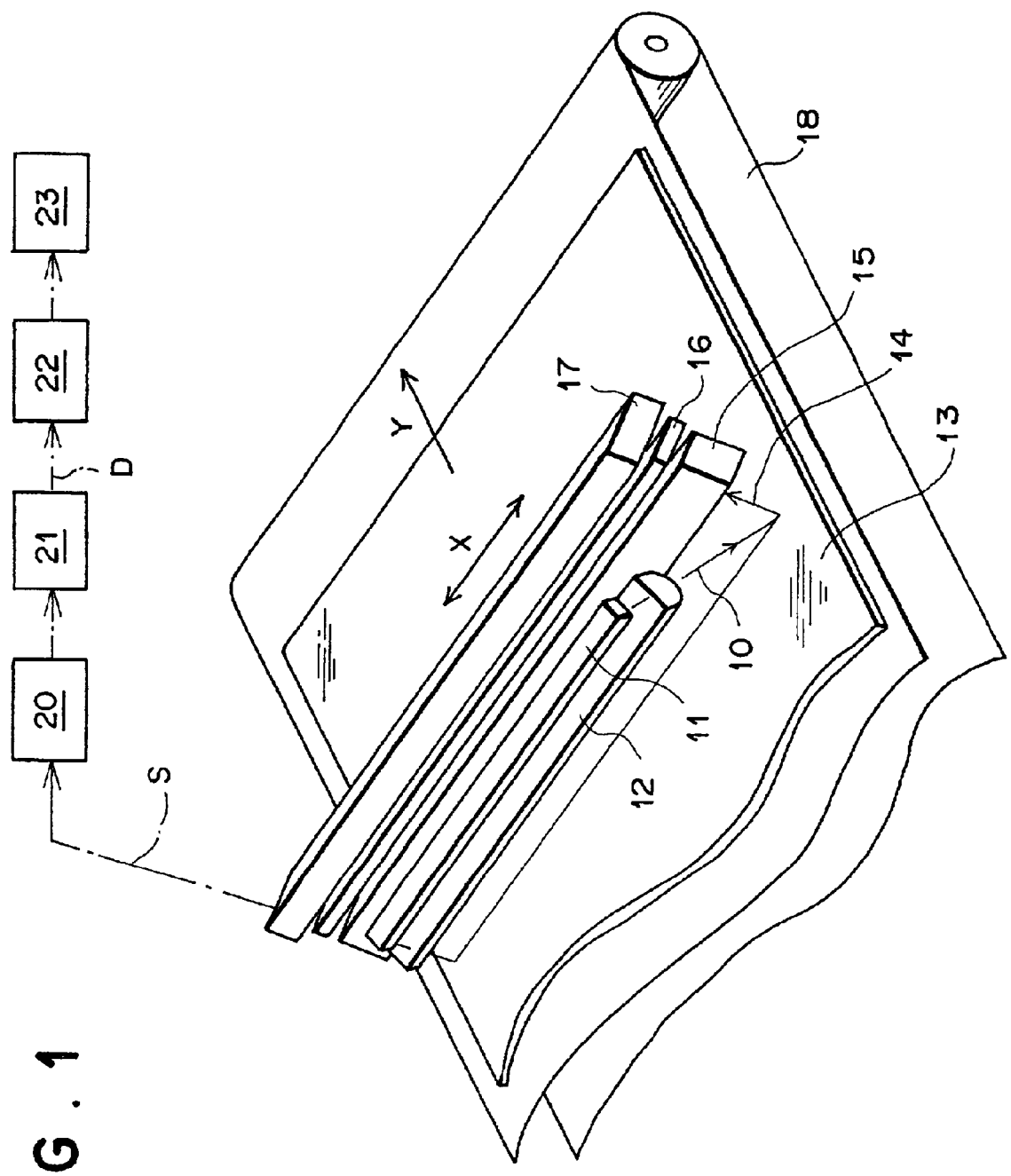
FIG. 1 is a schematic perspective view showing a part of a radiation image information read-out apparatus in accordance with an embodiment of the present invention.
Figure 2:
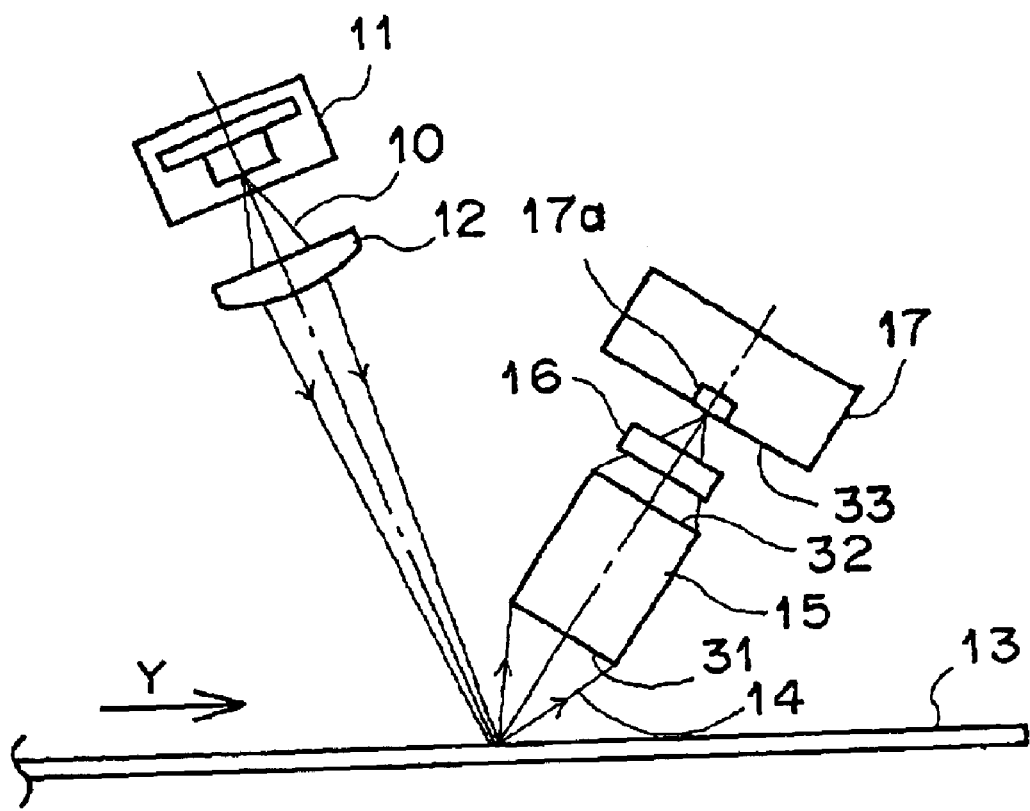
FIG. 2 is a side view taken showing the optical system of the radiation image information read-out apparatus shown in FIG. 1.

In FIGS. 1 and 2, a radiation image information read-out apparatus in accordance with an embodiment of the present invention comprises a stimulating light beam projecting means consisting of a laser diode array 11 which emits a stimulating light beam 10 in the form of a fan beam and a cylindrical lens 12 which converges the stimulating light beam 10 only in the plane of FIG. 2; a read-out means consisting of a lens array 15 which collects stimulated emission 14 emitted from a portion of a stimulable phosphor sheet 13 exposed to the stimulating light beam 10 projected onto the surface of the stimulable phosphor sheet 13 in a line, a stimulating light cutting color glass filter 16 disposed on the optical path of the stimulated emission 14 passing through the lens array 15, and a CCD line sensor which detects the stimulated emission 14 collected by the lens array 15; and an endless belt 18 (a sub-scanning means) which conveys at a constant speed in the direction of arrow Y perpendicular to the longitudinal direction of the line sensor (the direction of arrow X).

The radiation image information read-out apparatus further comprises an amplifier 20 which amplifies analog light detecting signal S output from the CCD line sensor 17, an A/D convertor 21 which digitizes the amplified light detecting signal S, an image processor 22 which carries out image processing on the digital image signal D output from the A/D convertor 21, and an image reproducing apparatus 23 which reproduces a radiation image on the basis of the processed image signal D.

Figure 3:
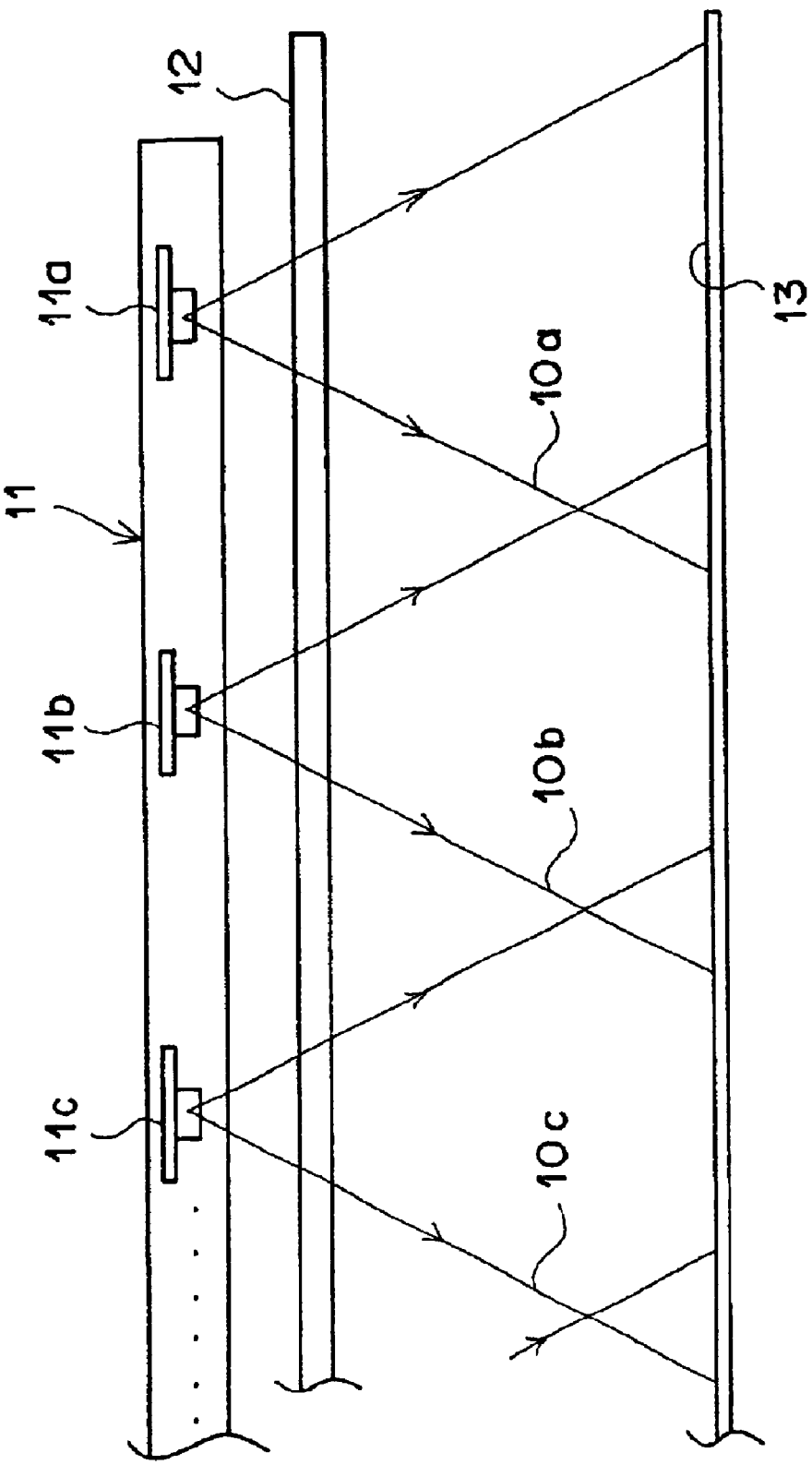
FIG. 3 is a front view of the sensors forming the optical system shown in FIG. 2.

As shown in FIG. 3, the stimulating light beam projecting means comprises a laser diode array 11 formed of a plurality of laser diodes 11a, 11b, 11c . . . each of which makes a laser oscillation, for instance, at 660 nm and which are arranged in a row. Stimulating light beams 10a, 10b, 10c . . . emitted from the respective laser diodes 11a, 11b, 11c . . . as divergent light beams are converged only in one direction by the cylindrical lens 12 to form fan beams. A line stimulating light beam 10 formed by merging the stimulating fan beams 10a, 10b, 10c . . . side by side irradiates a part of the stimulable phosphor sheet 13.

Figure 4:
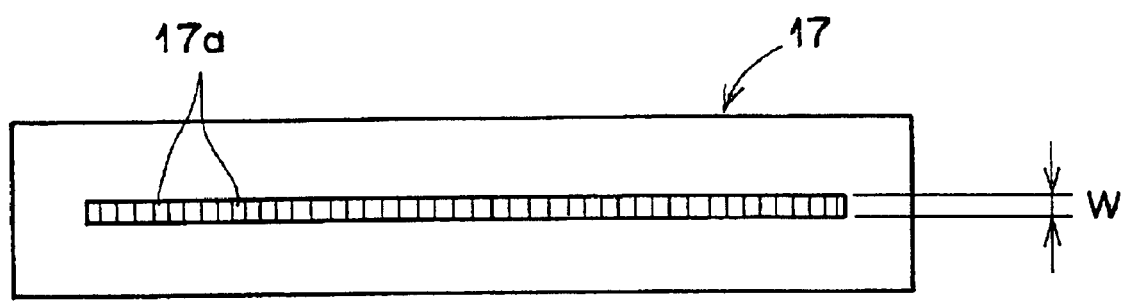
FIG. 4 is a fragmentary plan view showing a part of the line sensor shown employed in the radiation image information read-out apparatus.

As shown in FIG. 4, the CCD line sensor 17 comprises a plurality of sensor chips (photoelectric convertor elements) 17a arranged in a row. In this particular embodiment, the effective width W of the CCD line sensor 17 (the dimension in the direction perpendicular to the direction in which the sensor chips 17a are arranged), i.e., the width of each sensor chip 17a, is about 100 μm.

The lens array 15 comprises, for instance, an array of a plurality of refractive index profile type lenses 15a (FIGS. 5 and 6) arranged in one direction and collects and leads the stimulated emission 14 emitted from the stimulable phosphor sheet 13 to the CCD line sensor 17. Though the refractive index profile type lenses 15a may be arranged in one row or in a plurality of rows, they are arranged in two rows staggered from each other in the sub-scanning direction.

Figure 5:
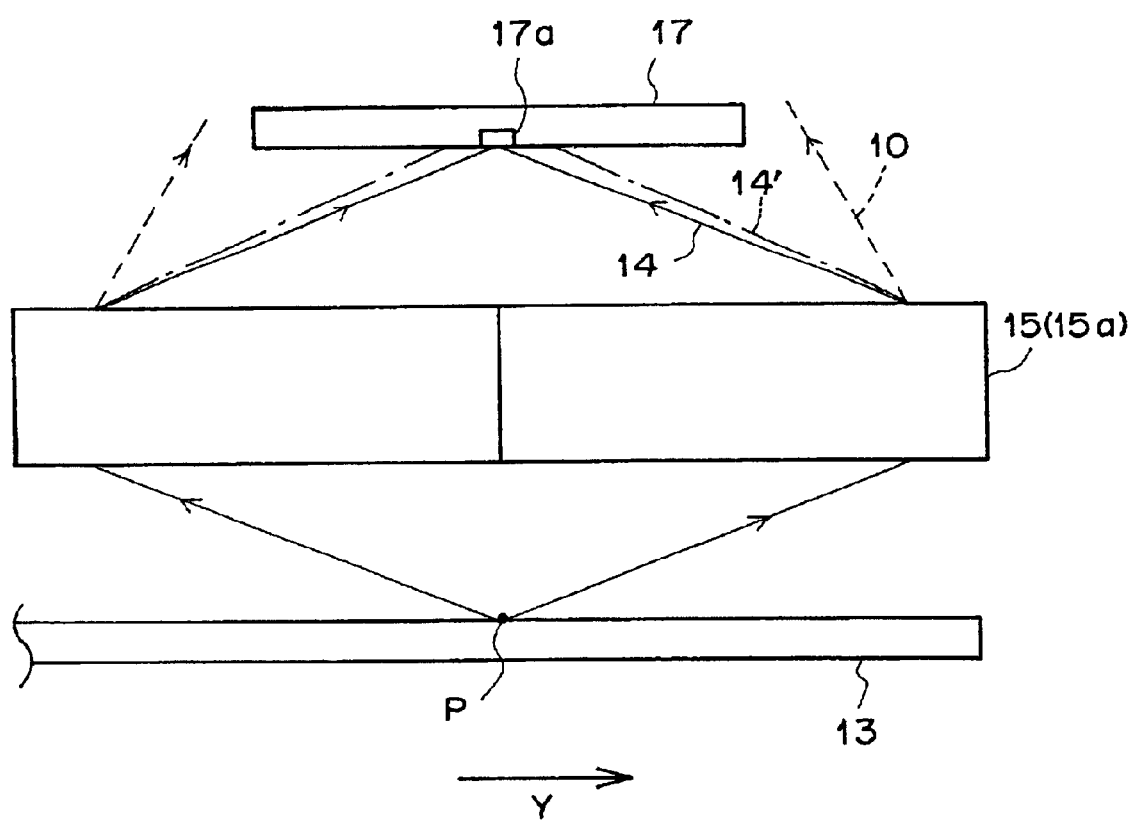
FIG. 5 is a schematic side view showing the read-out means and the stimulable phosphor sheet.
Figure 6:
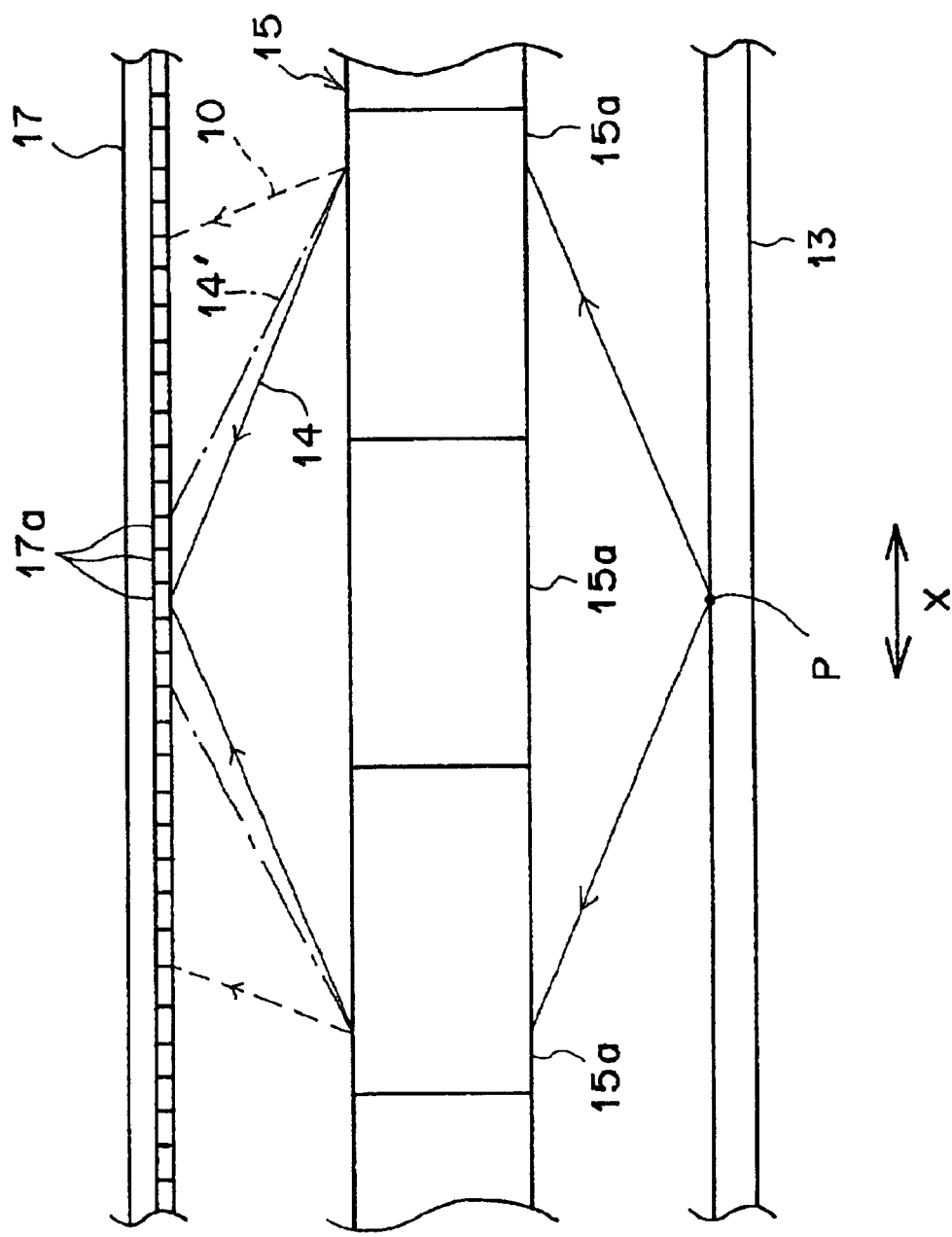
FIG. 6 is a schematic front view showing the read-out means and the stimulable phosphor sheet.

FIGS. 5 and 6 are a schematic side view and a schematic front view of the read-out means. Though being disposed obliquely to the stimulable phosphor sheet 13 in FIGS. 1 and 2, the read-out means is shown in parallel to the surface of the stimulable phosphor sheet 13 for the purpose of simplicity in FIGS. 5 and 6. Further, in FIGS. 5 and 6, the color glass filter 16 is abbreviated.

In this particular embodiment, the following formula (3) is satisfied.

$$\frac{1(mm)}{\lambda a(nm) - \lambda b(nm)} \leq \frac{\Delta d(mm)}{\Delta \lambda(nm)} \leq \frac{0.4(mm)}{\Delta \lambda b/2(nm)} \quad (3)$$

wherein λa (nm) represents the center wavelength of the stimulating light, λb (nm) represents the center wavelength of the stimulated emission, Δλ (nm) represents the wavelength difference between the longest wavelength and the shortest wavelength of the incident light components on each refractive index profile type lens 15a and Δd (mm) represents the distance of dispersion on the light receiving face of the incident light components on each refractive index profile type lens 15a.

The left side of formula (3) means that the difference between the wavelength of the stimulating light and that of the stimulated emission λa–λb results in the distance of dispersion on the light receiving face between the stimulating light and the stimulated emission not smaller than 1 mm. For example, assuming that the effective width of the light receiving face of the line sensor 17 is 100 μm, the distance of dispersion not smaller than 1 mm causes most of the stimulating light to go outside the light receiving face when most of the stimulated emission is collected on the light receiving face. Thus, the stimulating light and the stimulated emission are effectively separated from each other and the stimulating light is suppressed from impinging upon the light receiving face, whereby the image can be high in contrast.

The right side of formula (3) is for limiting the deterioration in efficiency of collecting the stimulated emission on the light receiving face and spread of the stimulated emission by the chromatic aberration of magnification not to affect the sharpness of the image. For example, when the effective width of the light receiving face is assumed to be 100 μm, spread of the stimulated emission can be suppressed not larger than four pixels, and accordingly deterioration in sharpness of the image due to dispersion of the stimulated emission can be prevented.

The aforesaid formula (3) is especially effective when the effective width of the light receiving face is in the range of 20 μm to 300 μm.

As shown in FIG. 5, the stimulated emission 14 emitted from point P on the stimulable phosphor sheet 13 and the stimulating light 10 reflected at the point P passes through the refractive index profile type lenses 15a and travels toward the light receiving faces of the sensor chips 17a of the line sensor 17. Since the system is arranged so that light of a wavelength equivalent to the center wavelength λb of the stimulated emission 14 is collected on the light receiving faces as shown by the solid line in FIG. 5, light of a wavelength equivalent to the center wavelength of the stimulating light 10, which is longer than the wavelength of the stimulated emission 14, is collected outside the light receiving faces as shown by the broken line, whereby the amount of the stimulating light impinging upon the light receiving face is reduced. Since the stimulated emission has a certain width in the wavelength range, longer wavelength components of the stimulated emission 14 can be collected outside the light receiving face as shown by the chained line 14'. When the amount of the stimulated emission 14' collected outside the light receiving face is excessively large, the stimulated emission collecting efficiency deteriorates. Further, as shown in FIG. 6, spread of the stimulated emission 14 in the direction of arrow X in which the sensor chips 17a are arranged can lead to the phenomenon that the stimulated emission 14 partly impinges upon sensor chips 17a which do not correspond to the point P, which can lead to deterioration in sharpness of the image. However, in this particular embodiment, since the aforesaid formula (3) is satisfied, spread of the stimulated emission 14 due to the width of the wavelength range of the stimulated emission 14 can be suppressed not to deteriorate the sharpness of the image.

For example, assuming that the center wavelength λa of the stimulating light is 680 nm, the center wavelength λb of the stimulated emission is 680 nm and the stimulated emission includes components of 370 to 430 nm (the width Δλb of the wavelength range of the stimulated emission is 60 nm), then $$\frac{1(mm)}{280(nm)} \leq \frac{\Delta d(mm)}{\Delta \lambda(nm)} \leq \frac{0.4(mm)}{30(nm)}$$

It is preferred that the effective width of the light receiving face of the photoelectric convertor elements be 20 to 300 μm. The aperture of the condenser lens is generally about 1 mm.

Operation of the radiation image information read-out apparatus will be described hereinbelow. Radiation image information of an object has been recorded on the stimulable phosphor sheet 13, for instance, by exposing the steps 13 to radiation passing through the object. The stimulable phosphor sheet 13 is conveyed in the sub-scanning direction Y at a constant speed. While the stimulable phosphor sheet 13 is being conveyed, the stimulating light beam 10 emitted from the laser diode array 11 is projected onto the stimulable phosphor sheet 13 in a line.

The portion of the stimulable phosphor sheet 13 exposed to the stimulating light beam 10 emits stimulated emission 14 in an amount according to radiation image information stored thereon. The stimulated emission 14 is collected and led to the CCD line sensor 17 by the lens array 15 which photoelectrically detects the stimulated emission 14. The part of the stimulating light beam 10 which is reflected at the surface of the stimulable phosphor sheet 13 toward the CCD line sensor 17 is partly cut by the stimulating light cut filter 16 and most of the stimulating light beam 10 is collected outside the light receiving face of the line sensor 17 by virtue of the chromatic aberration of magnification of the condenser lens.

The CC line sensor 17 outputs an analog light detecting signal S representing the amount of the stimulated emission 14. The detecting signal S is amplified by the amplifier 20 and is sampled on the basis of a predetermined pixel clock to be digitized to a digital image signal D by the A/D convertor 21.

After subjected to image processing such as gradation processing by the image processor 22, the digital image signal D is input into the image reproducing apparatus 23. The image reproducing apparatus 23 reproduces the radiation image recorded on the stimulable phosphor sheet 13 on the basis of the processed digital image signal D. For example, the image reproducing apparatus 23 may be a display means which may comprise a CRT or a recording apparatus which scans a photosensitive film with a light beam to record an image on the film.

Though, in the embodiment described above, CCD sensors are employed as the photoelectric convertor elements of the line sensor, for instance, amorphous silicone sensors or MOS image sensors may be employed.

Though, in the embodiment described above, a stimulating light cutting color glass filter is employed, the stimulating light can be sufficiently cut without such stimulating light cut filter.

Further, in the present invention, the stimulable phosphor sheet may be that provided with both radiation absorbing function and radiation energy storing function or that provided with an energy storing phosphor layer in order to separate radiation absorbing function and radiation energy storing function from each other as disclosed in Japanese Patent Application No. 11(1999)-372978. When the stimulable phosphor sheet with an energy storing phosphor layer is employed, detecting quantum efficiency, e.g., the radiation absorbance efficiency, stimulated emission emitting efficiency and stimulated emission taking out efficiency, is increased in total, whereby the radiation image quality can be improved.

Further, the stimulable phosphor sheet may be that for radiation energy subtraction, that is, a stimulable phosphor sheet provided with a pair of stimulable phosphor layers different in radiation energy absorbing properties and emits two kinds of stimulated emission from the front and back sides thereof.

Further, the present invention may be applied to a radiation image information read-out apparatus which is provided with a line sensor on each side of the stimulable phosphor sheet and a read-out means which takes difference between the amounts of stimulated emission read-out from the respective sides of the stimulable phosphor sheet pixel by pixel.

Further, as the stimulable phosphor sheet for radiation energy subtraction, an anisotropic stimulable phosphor sheet having lots of fine cells partitioned by partitions which extend, for instance, in the direction of thickness of the stimulable phosphor sheet and reflect the stimulating light may be employed.

What is claimed is:

1. A radiation image read-out apparatus comprising a stimulating light beam projecting means which projects a line stimulating light beam onto a stimulable phosphor sheet, storing thereon radiation image information, to extend in a main scanning direction, a line sensor consisting of a plurality of photoelectric convertor elements which receive stimulated emission emitted from the portion exposed to the line stimulating beam to convert the amount of stimulated emission to an electric signal and are arranged in a row which extends along the line portion of the stimulable phosphor sheet exposed to the line stimulating beam, a condenser lens which is disposed along the line sensor to collect the stimulated emission on the light receiving face of the line sensor and a sub-scanning means which moves one of the line sensor and the stimulable phosphor sheet relatively to each other in a sub-scanning direction intersecting the main scanning direction, wherein the improvement comprises that said condenser lens has a chromatic aberration of magnification in the sub-scanning direction such that most of the light in the wavelength range of the stimulated emission is collected on the light receiving face of the line sensor and most of the light in the wavelength range of the stimulating light is collected outside the light receiving face of the line sensor.

2. A radiation image information read-out apparatus as defined in claim 1 in which the effective width of the photoelectric convertor element as measured in the direction perpendicular to the longitudinal direction of the line sensor is 20 μm to 300 μm.

3. A radiation image information read-out apparatus as defined in claim 1 in which a stimulating light cut filter which is permeable to the stimulated emission and impermeable to the stimulating light is disposed between the line sensor and the stimulable phosphor sheet.

4. A radiation image information read-out apparatus as defined in claim 1 in which the distance of dispersion of incident light on the condenser lens in the longitudinal direction of the light receiving face of the line sensor is not larger than that in the direction perpendicular to the longitudinal direction of the light receiving face of the line sensor as measured on the light receiving face of the line sensor.

5. A radiation image read-out apparatus comprising a stimulating light beam projecting means which projects a line stimulating light beam onto a stimulable phosphor sheet, storing thereon radiation image information, to extend in a main scanning direction, a line sensor consisting of a plurality of photoelectric convertor elements which receive stimulated emission emitted from the portion exposed to the line stimulating beam to convert the amount of stimulated emission to an electric signal and are arranged in a row which extends along the line portion of the stimulable phosphor sheet exposed to the line stimulating beam, a condenser lens which is disposed along the line sensor to collect the stimulated emission on the light receiving face of the line sensor and a sub-scanning means which moves one of the line sensor and the stimulable phosphor sheet relatively to each other in a sub-scanning direction intersecting the main scanning direction, wherein the improvement comprises that the following formula (1) is satisfied, $$\frac{1(mm)}{\lambda a(nm) - \lambda b(nm)} \leq \frac{\Delta d(mm)}{\Delta \lambda(nm)} \qquad (1)$$

wherein λa (nm) represents the center wavelength of the stimulating light, μb (nm) represents the center wavelength of the stimulated emission, Δλ (nm) represents the wavelength difference between the longest wavelength and the shortest wavelength of the incident light components on the condenser lens and Δd (mm) represents the distance of dispersion on the light receiving face of the incident light components on the condenser lens, the incident light components on the condenser lens including the stimulating light and the stimulated emission, and 1 (mm) corresponding to one millimeter.

6. A radiation image information read-out apparatus as defined in claim 5 in which the following formula (2) is satisfied $$\frac{\Delta d(mm)}{\Delta \lambda(nm)} \leq \frac{0.4(mm)}{\Delta \lambda b/2(nm)} \quad (2)$$

wherein $\Delta\lambda b$ (nm) represents the width of the wavelength range of the stimulated emission.

7. A radiation image information read-out apparatus as defined in claim 5 in which the effective width of the photoelectric convertor element as measured in the direction perpendicular to the longitudinal direction of the line sensor is 20 µm to 300 µm.

8. A radiation image information read-out apparatus as defined in claim 5 in which a stimulating light cut filter which is permeable to the stimulated emission and impermeable to the stimulating light is disposed between the line sensor and the stimulable phosphor sheet.

9. A radiation image information read-out apparatus as defined in claim 5 in which the distance of dispersion of incident light on the condenser lens in the longitudinal direction of the light receiving face of the line sensor is not larger than that in the direction perpendicular to the longitudinal direction of the light receiving face of the line sensor as measured on the light receiving face of the line sensor.

* * * * *